United States Patent [19]
Reinheimer et al.

[11] 3,798,449
[45] Mar. 19, 1974

[54] AUTOMATIC MICROSCOPE FOCUSSING DEVICE

[76] Inventors: Gunter Reinheimer, Am Berg 11, 6301 Fellingshausen; Ludwig Leitz, Laufdorfer Weg 33, 633 Wetzlar, both of Germany

[22] Filed: May 21, 1973

[21] Appl. No.: 362,530

[30] Foreign Application Priority Data
May 23, 1972 Germany............................ 7219226

[52] U.S. Cl.................... 250/201, 250/216, 350/46
[51] Int. Cl........................... G01j 1/20, G02b 7/04
[58] Field of Search ............ 350/46; 250/201, 216; 355/57; 352/140; 95/45

[56] References Cited
UNITED STATES PATENTS

| | | | |
|---|---|---|---|
| 2,524,807 | 10/1950 | Kallmann | 250/201 X |
| 2,968,994 | 1/1961 | Shurcliff | 350/46 |
| 3,398,665 | 8/1968 | John, Jr. et al. | 95/45 |
| 3,450,018 | 6/1969 | John, Jr. | 95/45 |
| 3,555,280 | 1/1971 | Richards, Jr. | 250/201 |
| 3,721,827 | 3/1973 | Reinheimer | 250/201 |

*Primary Examiner*—James W. Lawrence
*Assistant Examiner*—T. N. Grigsby
*Attorney, Agent, or Firm*—Gilbert L. Wells, Krafft & Wells

[57] ABSTRACT

A microscope is provided with an optical grating in the light path of the objective lens at a predetermined distance from the object to focus an image of an object portion thereon. At least one photoelectric sensing device is arranged behind the grating for receiving light transmitted from the objective via the objective lens and for generating an electric control responsive to the deviation of the grating from the exact focussing position. A servo system utilizes the control signal for displacing the object along the optical axis in dependence on the signal so that the image of the object is automatically focussed on the grating. Means are provided for optionally varying the distance between the object and the grating, thereby bringing different object planes into focus.

6 Claims, 2 Drawing Figures

3,798,449

AUTOMATIC MICROSCOPE FOCUSSING DEVICE

BACKGROUND OF THE INVENTION

The present invention relates to an arrangement for the automatic focussing of a microscope on to different object planes.

Known is a device, for the remote setting of a measuring or work table with the aid of a setting motor, which can also be applied to focussing of microscopes. For the pre-selection of the zero setting of the focus, there are provided a compensating circuit equipped with a potentiometer and an inductive key as well as a change over switch for the selectable connection of the setting motor with an arrangement for the generation of a settable voltage for the defined displacement of the table from the zero position.

This known device has the disadvantage, that the zero setting must be found through a subjective visual judgement of sharpness, known to be subject to errors.

It is also known to determine focussing faults in an optical apparatus with an illuminating arrangement thereby, that in the plane of the illuminating diaphragm, which only on focussed setting of the surface of the specimen lies conjugate thereto, are arranged photo-electric receivers, which on focussed setting register an extreme illumination. A servo-stage, which complements the arrangement into a closed regulating circuit, is driven by the output signals of the photo-electric receivers, so that the focussing is automatically retained even on movements of the specimen. This arrangement is also suitable for the automatic focussing in only one plane.

Frequently, one does however want to examine parts of specimens lying in different object planes. This can be attained with the described arrangement only when one switches off the automatic focussing and focusses manually.

SUMMARY OF THE INVENTION

According to the present invention, there is provided an arrangement for automatically focussing a microscope on to a pre-selected one of a plurality of mutually displaced parallel planes in an object, the arrangement comprising a microscope objective lens to focus an image of an object portion located in a predetermined object plane in a predetermined image plane of the microscope, a stage for supporting the object imaged by the microscope, an optical grating for receiving light transmitted from the object via the objective lens, at least one photo-electric sensing device responsive to light transmitted via the grating, displacement means for effecting relative displacement between the grating and the predetermined image plane along the optical axis of the objective lens to select a different one of the object planes for focussing by the microscope lens, means for deriving from the or each sensing device an electrical control signal responsive to the extent of said relative displacement, and a servo system including means for so displacing the stage along the optical axis in response to the control signal that an image of an object portion in an object plane displaced along said axis by said extent is focussed on said grating.

BRIEF DESCRIPTION OF THE DRAWINGS

The invention will be more readily comprehended from the following description when taken in conjunction with the appending drawings, wherein.

DESCRIPTION OF THE PREFERRED EMBODIMENT

Figure 1:
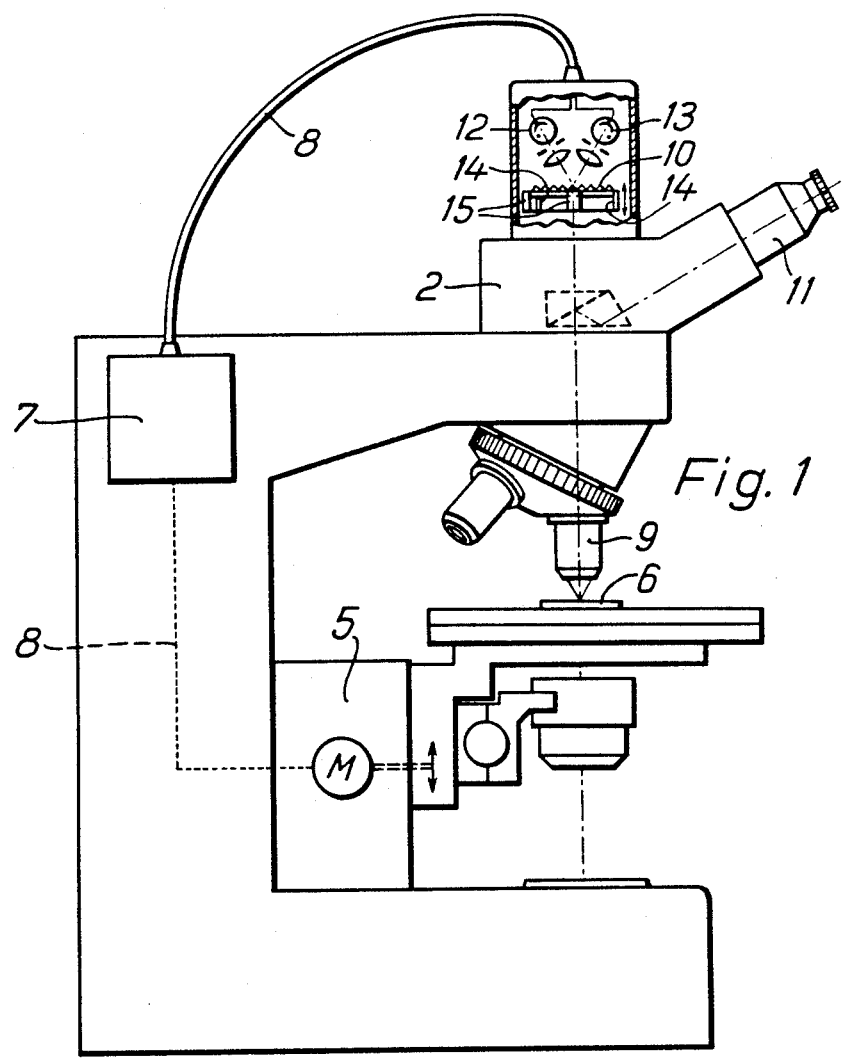
FIG. 1 shows a microscope provided with an automatic focussing arrangement embodying the invention.
Figure 2:
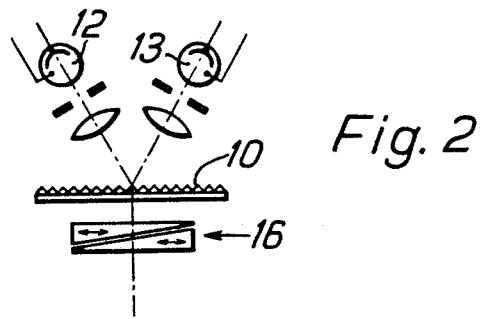
FIG. 2 shows a double optical wedge arrangement.

By the microscope illustrated in FIG. 1, an object 6 is imaged via an objective lens 9 through a tube 2 on to a transillumination raster or optical grating 10, which is arranged to be displaceable along the optical axis of the objective lens. This displacement by predetermined increments, by which pre-selected changes in the position of the observed object plane are defined, is obtained by means of micrometer screw or a wedge drive (not shown). Instead of displacing the optical grating or raster 10, a plane parallel plate of defined variable thickness in the form of a double optical wedge 16 (FIG. 2) is provided in the ray path between the raster 10 and the objective 9. Since this optical wedge 16 is disposed in the convergent ray path, variation in its thickness has the same effect as a grating or raster displacement along the optical axis of the objective lens 9. The displacement of the double optical wedge 16 can be calibrated directly, for example in micrometres, according to the preselected displacement of the focussing plane at the object. The ray path between objective lens 9 and eye piece 11 must not be influenced by the presence of the wedge 16. Since, alternating signals are more easily processed than unidirectional signals, it is preferable to obtain the measurement signals in the form of alternating signals. For this purpose, the transparent raster 10 is elastically mounted by means of springy wires 14, as illustrated in FIG. 1. Furthermore, displacement means acting upon the raster perpendicularly to the optical axis are present in the form of piezo-electric elements 15, which are fed by an electrical generator (not shown) and impart to the raster an oscillating motion in a plane perpendicular to the optical axis of the objective lens 9. The signal light beam leaving the raster is incident upon photo-electric receivers 12 and 13, the output signals of which are applied to an electrical evaluating circuit 7. This delivers drive signals via a connecting cable 8 to a setting arrangement 5 for raising or lowering the object table. An eye piece 11 is provided for the observation of the object 6. The operation of this arrangement is as follows:

Conditioned by the described regulating circuit, the object is always sharply imaged upon the raster 10 independently of the position of the objective lens. If the raster is displaced along the optical axis, then the position of the focus of the microscope objective lens changes simultaneously relative to the object surface, i.e. it is focussed on to a different object plane.

One could now think of controlledly changing the position of the object relative to the objective directly in known manner without any automaticity from the very start. In this case however, the focussing would be lost as soon as the object due to disturbing influences undesiredly displaces itself in its height position relative to the objective. The above described automatic focussing arrangement counter-acts any tendency for the object to go out of focus.

If, however, the focussing is lost the above described arrangement does not in all cases perform an automatic refocussing in the shortest possible direction as long as not the direction of the object displacement is sensed and evaluated. It may happen that in the beginning the object is displaced in the wrong direction and is moved into the focus position only during the backward movement. If it is desired to avoid the longer focussing time connected with such procedure it is readily possible to sense the direction of the object displacement from the focussing position by means of two gratings arranged one behind the other. The object may then always be displaced directly in the direction of the focussing position.

What is claimed is:

1. An arrangement for automatically focussing a microscope on to a pre-selected one of a plurality of mutually displaced parallel planes in an object, the arrangement comprising:
   a. a microscope objective lens to focus an image of an object portion located in a predetermined object plane in a predetermined image plane of the microscope;
   b. a stage for supporting the object imaged by the microscope:
   c. an optical grating for receiving light transmitted from the object via the objective lens;
   d. at least one photo-electric sensing device responsive to light transmitted via the grating;
   e. displacement means for effecting relative displacement between the grating and the predetermined image plane along the optical axis of the objective lens to select a different one of the object planes for focussing by the microscope lens;
   f. means for deriving from the or each sensing device an electrical control signal responsive to the extent of said relative displacement; and
   g. a servo system including means for so displacing the stage along the optical axis in response to the control signal that an image of an object portion in an object plane displaced along said axis by said extent is focussed on said grating.

2. An arrangement as claimed in claim 1, wherein the means for effecting said relative displacement comprises means to displace the grating along the optical axis.

3. An arrangement as claimed in claim 1, wherein the means for effecting said relative displacement comprises an optical component disposed in the path traversed by light received only by the grating, said optical component being adjustable to vary the length of said path.

4. An arrangement as claimed in claim 3, wherein the optical component comprises a double optical wedge assembly, the wedges being relatively displaceable in a direction transverse of said axis to vary the length of said path.

5. An arrangement as claimed in claim 1, comprising means to periodically displace the grating in a plane perpendicular to the axis to cause the or each photo-electric sensing device to provide respective alternating electrical signals responsive to the extent of the relative displacement between the grating and the image formed by the objective lens.

6. An arrangement as claimed in claim 5, comprising a pair of photo-electric sensing devices.

* * * * *